US012617891B2

(12) United States Patent
Fiore et al.

(10) Patent No.: US 12,617,891 B2
(45) Date of Patent: May 5, 2026

(54) FLEXIBLE FOAMS COMPRISING ADDITIVES FOR IMPROVING HARDNESS

(71) Applicant: Momentive Performance Materials Inc., Waterford, NY (US)

(72) Inventors: Lorenzo Fiore, Casciago (IT); Lijun Feng, Leverkusen (DE); Marcel Hartmann, Essen (DE); Wen Huang, Shanghai (CN); Antonie-Gabriel Kiss, Bergisch Gladbach (DE); Alberto Giovanni Mellé, Geneva (CH)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 17/386,887

(22) Filed: Jul. 28, 2021

(65) Prior Publication Data

US 2023/0049261 A1    Feb. 16, 2023

(51) Int. Cl.
| | |
|---|---|
| *C08G 18/48* | (2006.01) |
| *C08G 18/61* | (2006.01) |
| *C08G 18/76* | (2006.01) |
| *C08G 77/46* | (2006.01) |
| *C08J 9/00* | (2006.01) |
| *C08J 9/30* | (2006.01) |

(52) U.S. Cl.
CPC ............... *C08G 18/61* (2013.01); *C08J 9/30* (2013.01); *C08G 77/46* (2013.01); *C08J 2375/04* (2013.01)

(58) Field of Classification Search
None
See application file for complete search history.

(56) References Cited

U.S. PATENT DOCUMENTS

| | | | | |
|---|---|---|---|---|
| 5,145,879 A | | 9/1992 | Budnik et al. | |
| 5,432,206 A | * | 7/1995 | Stanga | C08G 77/46 |
| | | | | 521/110 |
| 5,489,617 A | * | 2/1996 | Miller | C08G 77/46 |
| | | | | 521/112 |
| 5,807,903 A | * | 9/1998 | Stanga | C08G 77/46 |
| | | | | 521/112 |
| 5,883,142 A | * | 3/1999 | Chojnacki | C08J 9/0061 |
| | | | | 516/8 |
| 5,981,613 A | * | 11/1999 | Cobb | C08J 9/0061 |
| | | | | 528/25 |
| 5,985,948 A | | 11/1999 | Burkhart et al. | |
| 6,653,359 B2 | | 11/2003 | Hilker et al. | |
| 7,183,330 B2 | * | 2/2007 | Furlan | C08J 9/149 |
| | | | | 521/173 |
| 8,044,109 B2 | | 10/2011 | Gu et al. | |
| 2008/0153992 A1 | | 6/2008 | Knott et al. | |
| 2009/0088488 A1 | | 4/2009 | Bruckner et al. | |
| 2010/0286295 A1 | | 11/2010 | Heisler et al. | |
| 2011/0040036 A1 | * | 2/2011 | Herzig | C08G 77/12 |
| | | | | 525/100 |
| 2012/0101175 A1 | | 4/2012 | Willoughby et al. | |
| 2013/0143977 A1 | * | 6/2013 | Villa | C08G 18/3203 |
| | | | | 568/613 |
| 2014/0088212 A1 | * | 3/2014 | Dai | C08K 5/5419 |
| | | | | 521/112 |
| 2015/0028247 A1 | * | 1/2015 | Peters | E04B 2/02 |
| | | | | 521/137 |
| 2018/0179322 A1 | * | 6/2018 | Kiss | C08G 18/244 |

FOREIGN PATENT DOCUMENTS

| | | |
|---|---|---|
| JP | 2000248036 | 9/2000 |
| JP | 2010535931 | 11/2010 |
| WO | 2009/011776 A1 | 1/2009 |
| WO | 2009/023116 A1 | 2/2009 |
| WO | 2020/106538 A1 | 5/2020 |

OTHER PUBLICATIONS

International Search Report and Written Opinion mailed Nov. 11, 2022; International Patent Application No. PCT/US2022/037980 filed Jul. 22, 2022. ISA/EP.

* cited by examiner

*Primary Examiner* — Melissa A Rioja
(74) *Attorney, Agent, or Firm* — Joseph Waters; McDonald Hopkins LLC

(57) ABSTRACT

A polyurethane foam-forming composition comprising a polyether functional silicone additive with an active hydrogen atom. The addition of the polyether functional silicone additive to a foam-forming composition for a flexible foam increases the hardness of the resulting foam without adversely affecting other properties of the foam.

15 Claims, No Drawings

FLEXIBLE FOAMS COMPRISING ADDITIVES FOR IMPROVING HARDNESS

FIELD

The present invention relates to polyurethane foam-forming compositions containing a silicone additive that improves the hardness of the resulting foams, polyurethane foams formed from said polyurethane foam-forming compositions and processes for making said polyurethane foams. The present invention provides for a flexible polyurethane foam composition and foams made therefrom comprising a polyether functional siloxane where the polyether group contains a reactive hydrogen.

BACKGROUND

Polyurethane foams are extensively used in a variety of industrial and consumer applications. The production of polyurethane foams is well known to those skilled in the art. Polyurethanes are produced from the reaction of —NCO isocyanate groups present in isocyanates with —OH hydroxyl groups present in polyols. The polyurethane foam production, the reaction of isocyanates with polyols, is carried out in the presence of several additives: surfactants, catalysts, cross-linking agents, flame retardants, water, blowing agents, and other additives.

Flexible polyurethane foams, a subcategory of the polyurethane foams, are generally soft, less dense, pliable, and subject to structural rebound subsequent to loading. Due to their high cushioning property, flexible polyurethane foams are widely used for vehicle cushion materials, furniture mats, beddings, miscellaneous goods, and the like. The flexible polyurethane foams are generally manufactured by causing reaction of organic polyisocyanate with two or more compounds containing active hydrogen under existence of a catalyst, a surfactant, and other additives. As the active hydrogen containing compound, there are used polyols, polymer polyols obtained by radical polymerization of acrylonitrile and styrene in a polyol, primary and secondary polyamines, water, and the like.

One issue with flexible polyurethane foams is that the hardness of the foam generally cannot be increased without special additives (e.g., fillers or certain types of polyols), and/or decreasing the foam's porosity. The use of fillers is widely employed in the production of flexible foam. Fillers suitable for increasing the hardness are generally categorized into inorganic and organic fillers. Examples of inorganic fillers include, for example, calcium carbonate, barium sulphate, melamine, and the like. Examples of organic fillers (plastic particles) include, for example, copolymer polyols, modified copolymer polyols, modified isocyanate prepolymers, and the like. Inorganic fillers increase hardness while they degrade other physical properties, such as tensile strength, elongation, tear strength, and compression sets significantly. Organic fillers (plastic type) are normally connected into the foam matrix and have uniform macro-distribution. Organic fillers, therefore, tend to provide better performance compared with inorganic fillers. The use of inorganic and/or organic fillers significantly increase the cost to produce flexible foams, increased the difficulty in the foaming process, and can significantly decrease other physical properties especially at high filler dosage levels that may be required to increase the hardness to a desired level.

Decreasing or lowering the porosity of the foam is also a consideration and employed to affect the hardness of flexible foams. There are different methods to reduce porosity including, for example, increasing gelling catalyst dosage, increasing silicone surfactant dosage, increasing isocyanate index, and using cross-linkers. The hardness improvement achieved by these methods, however, is not always straight forward or easily controlled, and the impact on the hardness is not always predictable or controllable. While it brings potential side-effects on other physical performance, the hardness reduces gradually when porosity increases in the foam.

SUMMARY

In one aspect, provided is a foam forming composition for forming a flexible polyurethane foam, where the foam composition comprises a silicone additive that is found to improve the hardness in the foam. The silicone additive is a siloxane comprising a reactive polyether functional group. The use of the silicone additive is found to increase the hardness of the foam without negatively affecting other properties in the foam. Additionally, these polyether functional siloxanes enable improved foam hardness in the flexible foam formulations with the potential elimination of copolymer polyols, or other additives.

In one aspect, provided is a polyurethane foam-forming composition comprising: (a) a polyol; (b) a polyisocyanate; (c) a catalyst; (d) a surfactant; and (e) a polyether functional silicone of the formula:

$$M^*D_xD''_yM^*$$

where:

$M^*$ is $R_a(CH_3)_{3-a}SiO_{1/2}$

D is $(CH_3)_2SiO_{2/2}$

D" is $(CH_3)(R)SiO_{2/2}$ x is 0-100;

y is 0-20 a is 0 or 1 with the proviso that y is greater than 0 if a is 0; when a is 0, $M^*$ becomes M: $(CH_3)_3SiO_{1/2}$.

R is polyether substituent $C_nH_{2n}O(C_2H_4O)_b(C_3H_6O)_cR^1$ where $R^1$ is —H, —$R^3N(H)R^2$, or —$R^3SH$, $R^2$ is H or a C1-C10 alkyl, $R^3$ is C1-C10 alkylene; n is 3 to 4; b is a number such that the ethylene oxide residues constitute from about 30% to about 100% by weight of the alkylene oxide residues of the polyether substituent R; c is a number such that the propylene oxide residues constitute from about 0% to about 70% by weight of the alkylene oxide residues of the polyether substituent R; and the substituent R has a number average molecular weight of from about 200 Dalton to about 5000 Dalton.

In one embodiment, b in polyether functional silicone (e) is such that the ethylene oxide residues constitute from about 35% to about 100% by weight of the alkylene oxide residues of the polyether substituent R.

In one embodiment, b in polyether functional silicone (e) is such that the ethylene oxide residues constitute from about 40% to about 100% by weight of the alkylene oxide residues of the polyether substituent R.

In one embodiment, the polyether substituent R of the polyether functional silicone (e) has an ethylene oxide content of from about 70% to about 100% by weight.

In one embodiment, b is such that the ethylene oxide residues constitute from about 75% to about 95% by weight of the alkylene oxide residues of the polyether substituent R.

In one embodiment, $R^1$ in the polyether functional silicone (e) is —H.

In one embodiment, the polyether substituent R of the polyether functional silicone (e) comprises a polyether substituent having a number average molecular weight of from about 400 Dalton to about 4000 Dalton.

In one embodiment, R in the polyether functional silicone (e) has a number average molecular weight of from about 500 Dalton to about 1500 Dalton.

In one embodiment, y in the polyether functional silicone (e) is 1-20.

In one embodiment, y in polyether functional silicone (e) is 1-10.

In one embodiment, the polyether functional silicone (e) comprises (i) a first polyether substituent R having a number average molecular weight of from about 200 Dalton to about 2000 Dalton, and an ethylene oxide content of from about 35% to about 100% by weight; from about 40% to about 95% by weight; and (ii) a second polyether substituent having a number average molecular weight of from about 2000 Dalton to about 5000 Dalton and an ethylene oxide content of from about 35% to about 100% by weight of the alkylene oxide residues of the polyether substituent.

In one embodiment, the first and second polyether substituents each have an ethylene oxide content of about 40% by weight of the alkylene oxide residues of the polyether substituent.

In one embodiment, the polyether functional silicone (e) is present in an amount of from about 0.1 to about 10 parts by weight based on the total weight of the composition.

In another aspect, provide is a polyurethane foam formed from the compositions of any of the previous aspects or embodiments.

In one embodiment, the foam has a hardness that is greater than the hardness of a foam in the absence of the polyether functional silicone (e).

DETAILED DESCRIPTION

The present invention provides polyurethane foam-forming compositions containing a silicone surfactant with a pendent hydroxyl-terminated polyalkene oxide group, polyurethane foams formed from said polyurethane foam-forming compositions and processes for making said polyurethane foams. The polyurethane foam-forming compositions containing a silicone surfactant with a pendent hydroxyl-terminated polyalkene oxide group can be used to form flexible foam having excellent properties including a high open cell concentration, compression set, tensile strength, elongation, low fugitive emissions, or a combination of two or more thereof.

The present invention provides a polyurethane foam-forming composition comprising:

(a) a polyol;
(b) a polyisocyanate;
(c) a catalyst;
(d) a surfactant; and
(e) a polyether functional silicone of the formula:

$$M^*D_xD''_yM^*$$

where:
$M^*$ is $R_a(CH_3)_{3-a}SiO_{1/2}$
D is $(CH_3)_2SiO_{2/2}$
D'' is $(CH_3)(R)SiO_{2/2}$
x is 0-100;
y is 0-20
a is 0 or 1 with the proviso that y is greater than 0 if a is 0; when a is 0, $M^*$ becomes M: $(CH_3)_3SiO_{1/2}$.
R is polyether substituent $C_nH_{2n}O(C_2H_4O)_b(C_3H_6O)_cR^1$ where $R^1$ is —H, —$R^3N(H)R^2$, or —$R^3SH$, $R^2$ is H or a C1-C10 alkyl, $R^3$ is C1-C10 alkylene; n is 3 to 4; b is a number such that the ethylene oxide residues constitute from about 30% to about 100% by weight of the alkylene oxide residues of the polyether substituent R; c is a number such that the propylene oxide residues constitute from about 0% to about 70% by weight of the alkylene oxide residues of the polyether substituent R; and the substituent R has a molecular weight of from about 200 Dalton to about 5000 Dalton.

In one embodiment, the polyether substituent R of the polyether functional silicone has an ethylene oxide content of from about 35% to about 100% by weight; from about 40% to about 95% by weight; from about 45% to about 80% by weight; from about 50% to about 75% by weight; or from about 55% to about 65% by weight of the alkylene oxide residues of the polyether substituent. In one embodiment, the polyether substituent R of the polyether functional silicone has an ethylene oxide content of from about 40% to about 100% by weight of the alkylene oxide residues of the polyether substituent. In one embodiment, the polyether substituent R of the polyether functional silicone has an ethylene oxide content of from about 65% to about 100% by weight; from about 70% to about 95% by weight; from about 75% to about 90% by weight; or from about 80% to about 85% by weight of the alkylene oxide residues of the polyether substituent.

In one embodiment, the polyether substituent R has a number average molecular weight (Mn) of from about 200 Dalton to about 5000 Dalton; from about 350 Dalton to about 4500 Dalton; from about 600 Dalton to about 4000 Dalton; from about 700 Dalton to about 3500 Dalton; from about 750 Dalton to about 3000 Dalton; from about 800 Dalton to about 2500 Dalton; from about 850 Dalton to about 2000 Dalton; or from about 550 Dalton to about 4000 Dalton. In one embodiment, the polyether substituent R has a molecular weight of from about 500 Dalton to about 4000 Dalton. The number average molecular weight of the R group is evaluated by GPC standard methods for example determined by gel permeation chromatography (GPC) after appropriate calibration, particularly with polystyrene as standard.

In one embodiment, x is from 0-100, 1-95, 2-90, 4-85, 5-80, 10-75, 15-65, 20-60, 25-50, or 30-45. In one embodiment, x is from 1.5 to 65. In one embodiment, y is from 0-20, 1-18, 2-15, 3-12, 4-10, or 5-8. In one embodiment, y is from 1.5 to 8.

The polyether functional silicone may comprise one type of polyether substituent or it may comprise two or more different types of polyether substituents. Where the polyether silicone comprises two or more different polyether substituents, the polyether substituents may differ from one another in terms of one or more aspects including, for example, overall molecular weight, molecular weight of the polyether substituents, percentage of ethylene oxide content of the polyether substituents, etc.

In one embodiment, the polyether functional silicone includes (i) a first polyether substituent having a molecular weight of from about 200 Dalton to about 5000 Dalton; from about 550 Dalton to about 4500 Dalton; from about 600 Dalton to about 4000 Dalton; from about 700 Dalton to about 3500 Dalton; from about 750 Dalton to about 3000 Dalton; from about 800 Dalton to about 2500 Dalton; from about 850 Dalton to about 2000 Dalton; or from about 1000 Dalton to about 1500 Dalton; and an ethylene oxide content of from about 35% to about 100% by weight; from about 40% to about 95% by weight; from about 45% to about 80% by weight; from about 50% to about 75% by weight; or from about 55% to about 65% by weight of the alkylene oxide residues of the polyether substituent. In one embodiment, the polyether substituent R of the polyether functional silicone has an ethylene oxide content of from about 65% to about 100% by weight; from about 70% to about 95% by weight; from about 75% to about 90% by weight; or from about 80% to about 85% by weight of the alkylene oxide residues of the polyether substituent; and (ii) a second polyether substituent having a molecular weight of from about 200 Dalton to about 5000 Dalton; from about 550 Dalton to about 4500 Dalton; from about 600 Dalton to about 4000 Dalton; from about 700 Dalton to about 3500 Dalton; from about 750 Dalton to about 3000 Dalton; from about 800 Dalton to about 2500 Dalton; from about 850 Dalton to about 2000 Dalton; or from about 1000 Dalton to about 1500 Dalton; and an ethylene oxide content of from about 35% to about 100% by weight; from about 40% to about 95% by weight; from about 45% to about 80% by weight; from about 50% to about 75% by weight; or from about 55% to about 65% by weight of the alkylene oxide residues of the polyether substituent. In one embodiment, the polyether substituent R of the polyether functional silicone has an ethylene oxide content of from about 65% to about 100% by weight; from about 70% to about 95% by weight; from about 75% to about 90% by weight; or from about 80% to about 85% by weight of the alkylene oxide residues of the polyether substituent.

In one embodiment, the polyether functional silicone includes (i) a first polyether substituent having a molecular weight of from about 200 Dalton to about 1000 Dalton; from about 250 Dalton to about 750 Dalton; from about 300 Dalton to about 500 Dalton; or from about 400 Dalton to about 450 Dalton; and an ethylene oxide content of from about 35% to about 100% by weight; from about 40% to about 95% by weight; from about 45% to about 80% by weight; from about 50% to about 75% by weight; or from about 55% to about 65% by weight of the alkylene oxide residues of the polyether substituent. In one embodiment, the polyether substituent R of the polyether functional silicone has an ethylene oxide content of from about 65% to about 100% by weight; from about 70% to about 95% by weight; from about 75% to about 90% by weight; or from about 80% to about 85% by weight of the alkylene oxide residues of the polyether substituent; and (ii) a second polyether substituent having a molecular weight of from about 1200 Dalton to about 5000 Dalton; from about 1500 Dalton to about 4500 Dalton; from about 1750 Dalton to about 4000 Dalton; from about 2000 Dalton to about 3500 Dalton; or from about 2500 Dalton to about 3000 Dalton; and an ethylene oxide content of from about 35% to about 100% by weight; from about 40% to about 95% by weight; from about 45% to about 80% by weight; from about 50% to about 75% by weight; or from about 55% to about 65% by weight of the alkylene oxide residues of the polyether substituent. In one embodiment, the polyether substituent R of the polyether functional silicone has an ethylene oxide content of from about 65% to about 100% by weight; from about 70% to about 95% by weight; from about 75% to about 90% by weight; or from about 80% to about 85% by weight of the alkylene oxide residues of the polyether substituent. In one embodiment, each of the first and second polyether substituents have an ethylene oxide content of from about 40% to about 60%.

The polyether functional silicone can be present in the composition in an amount of from about 0.1 to about 10 parts by weight (pbw), about 0.5 to about 7.5 pbw, about 1 to about 5 pbw, about 1.5 to about 4 pbw, or about 2 to about 3 pbw based on the total weight of polyol.

According to an embodiment, the polyurethane foam-forming composition is directed to preparation of flexible polyurethane foam. Flexible polyurethane foam is widely used for furniture cushions, mattresses, automotive cushions and padding, and numerous other applications requiring better support and comfort. The present invention is useful in conventional foams, which have densities as low as 15 kg/m$^3$, and for the most part below about 40 kg/m$^3$.

The polyol (a) component can be any polyol useful to form a polyurethane foam and particularly for forming a flexible foam. The polyol is normally a liquid polymer possessing hydroxyl groups. The term "polyol" includes linear and branched polyethers (having ether linkages), polyesters and blends thereof, and comprising at least two hydroxyl groups. In one embodiment, the polyol can be at least one of the types generally used to prepare polyurethane foams. A polyether polyol having a weight average molecular weight of from about 150 to about 10,000 is particularly useful.

Polyols containing reactive hydrogen atoms generally employed in the production of flexible polyurethane foams can be employed in the formulations of the present invention. The polyols are hydroxy-functional chemicals or polymers covering a wide range of compositions of varying molecular weights and hydroxy functionality. These polyhydroxyl compounds are generally mixtures of several components although pure polyhydroxyl compounds, i.e. individual compounds, can in principle be used.

Representative polyols include, but are not limited to, polyether polyols, polyester polyols, polyetherester polyols, polyesterether polyols, polybutadiene polyols, acrylic component-added polyols, acrylic component-dispersed polyols, styrene-added polyols, styrene-dispersed polyols, vinyl-added polyols, vinyl-dispersed polyols, urea-dispersed polyols, and polycarbonate polyols, polyoxypropylene polyether polyol, mixed poly (oxyethylene/oxypropylene) polyether polyol, polybutadienediols, polyoxyalkylene diols, polyoxyalkylene triols, polytetramethylene glycols, polycaprolactone diols and triols, all of which possess at least two primary hydroxyl groups.

Some specific, non-limiting examples of polyether polyols include, polyoxyalkylene polyol, particularly linear and branched poly(oxyethylene)glycol, poly(oxypropylene)glycol, copolymers of the same and combinations thereof. Non-limiting examples of modified polyether polyols include polyoxypropylene polyether polyol into which is dispersed poly(styrene acrylonitrile) or polyurea, and poly (oxyethylene/oxypropylene) polyether polyols into which is dispersed poly(styrene acrylonitrile) or polyurea.

Examples of suitable polyols include, but are not limited to, those such as Arcol® polyol 1053, Arcol® E-743, Hyperlite® E-848 from Covestro, Voranol® CP3322 polyols from Dow, Lupranol® polyols from BASF, Stepanpol® polyols from Stepan, Terate® polyols from Invista, or a combination of two or more thereof.

Graft or modified polyether polyols comprise dispersed polymeric solids.

Suitable polyesterpolyols include, but are not limited to, aromatic polyester polyols such as those made with phthalic anhydride (PA), dimethylterephthalate (DMT) polyethyleneterephthalate (PET) and aliphatic polyesters, and the like.

Other non-limiting examples of suitable polyols include those derived from propylene oxide and ethylene oxide and an organic initiator or mixture of initiators of alkylene oxide polymerization and combinations thereof.

The hydroxyl number of a polyol is the number of milligrams of potassium hydroxide required for the complete hydrolysis of the fully acylated derivative prepared from one gram of polyol. The hydroxyl number is also defined by the following equation, which reflects its relationship with the functionality and molecular weight of the polyol:

$$\text{OH No.} = (56.1 \times 1000 \times f)/M.W.$$

wherein OH=hydroxyl number of the polyol; f=average functionality, that is, average number of hydroxyl groups per molecule of the polyether polyol; and M.W.=number average molecular weight of the polyether polyol. The average number of hydroxyl groups in the polyether polyol is achieved by control of the functionality of the initiator or mixture of initiators used in producing the polyether polyol.

In one embodiment, the polyol can have a functionality of from about 2 to about 12, and in another embodiment of the present invention, the polyol has a functionality of at least 2. It will be understood by a person skilled in the art that these ranges include all subranges there between.

In one embodiment, the polyurethane foam-forming composition comprises a polyether polyol having a hydroxyl number of from about 10 to about 3000, more particularly from about 20 to about 2000 even more particularly from about 30 to about 1000 and still even more particularly from about 35 to about 800. Here as elsewhere in the specification and claims, numerical values can be combined to form new and non-disclosed ranges.

The polyisocyanate (b) can include any organic compound contain at least two isocyanate groups that can be used for production of polyurethane foam. In one embodiment, the polyisocyanate can be an organic compound that comprises at least two isocyanate groups and generally will be any known or later discovered aromatic or aliphatic polyisocyanates.

In one embodiment, the polyisocyanate can be a hydrocarbon diisocyanate, including alkylenediisocyanate and arylene diisocyanate.

Representative and non-limiting examples of polyisocyanates include toluene diisocyanate, diphenylmethane isocyanate, polymeric versions of toluene diisocyanate and diphenylmethane isocyanate, methylene diphenyl diisocyanate (MDI), 2,4- and 2,6-toluene diisocyanate (TDI), triisocyanates and polymethylene poly(phenylene isocyanates) also known as polymeric or crude MDI and combinations thereof. Commercially available 2,4- and 2,6-toluene diisocyanates include Mondur® TDI.

In one embodiment, the polyisocyanate can be at least one mixture of 2,4-toluene diisocyanate and 2,6-toluene diisocyanate wherein 2,4-toluene diisocyanate is present in an amount of from about 80 to about 85 weight percent of the mixture and wherein 2,6-toluene diisocyanate is present in an amount of from about 20 to about 15 weight percent of the mixture. It will be understood by a person skilled in the art that these ranges include all subranges there between.

The amount of polyisocyanate included in the polyurethane foam-forming composition relative to the amount of other materials in polyurethane foam-forming composition is described in terms of "Isocyanate Index." "Isocyanate Index" means the actual amount of polyisocyanate used divided by the theoretically required stoichiometric amount of polyisocyanate required to react with all active hydrogen in polyurethane foam-forming composition multiplied by one hundred (100).

In one embodiment, the Isocyanate Index in the polyurethane foam-forming composition is from about 60 to about 300, more particularly from about 70 to about 200, even more particularly from about 80 to about 120. It will be understood by a person skilled in the art that these ranges include all subranges there between.

The catalyst (c) for the production of the polyurethane foams herein can be a single catalyst or mixture of catalysts that can be used to catalyze the reactions of polyol and water with polyisocyanates to form polyurethane foam. It is common, but not required, to use both an organoamine and an organotin compound for this purpose. Other metal catalysts can be used in place of, or in addition to, organotin compound.

Representative and non-limiting examples of suitable materials for the catalyst (c) include:

(i) tertiary amines such as bis(2,2'-dimethylamino)ethyl ether, trimethylamine, triethylenediamine, 1,8-diazabicyclo[5.4.0]undec-7-ene, triethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine, 2-{[2-(2-dimethylaminoethoxy)ethyl]methylamino}ethanol, pyridine oxide, and the like;

(ii) strong bases such as alkali and alkaline earth metal hydroxides, alkoxides, phenoxides, and the like;

(iii) acidic metal salts of strong acids such as ferric chloride, stannous chloride, antimony trichloride, bismuth nitrate and chloride, and the like;

(iv) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediamines, salicylaldehyde-imine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(v) alcoholates and phenolates of various metals such as $Ti(OR)_4$, $Sn(OR)_4$, $Sn(OR)_2$, $Al(OR)_3$, and the like, wherein R is alkyl or aryl of from 1 to about 12 carbon atoms, and reaction products of alcoholates with carboxylic acids, beta-diketones, and 2-(N,N-dialkylamino) alkanols, such as chelates of titanium obtained by this or equivalent procedures;

(vi) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like;

(vii) organometallic derivatives of tetravalent tin, trivalent and pentavalent As, Sb, and Bi, and metal carbonyls of iron and cobalt;

and combinations thereof.

In one embodiment, the catalyst (c) is organotin compounds that are dialkyltin salts of carboxylic acids, including the non-limiting examples of dibutyltin diacetate, dibutyltin dilaureate, dibutyltin maleate, dilauryltin diacetate, dioctyltin diacetate, dibutyltin-bis(4-methylaminobenzoate), dibutyltindilaurylmercaptide, dibutyltin-bis(6-methyl aminocaproate), and the like, and combinations of two or more thereof.

Similarly, in another embodiment there may be used trialkyltin hydroxide, dialkyltin oxide, dialkyltin dialkoxide, or dialkyltin dichloride, and combinations of two or more thereof can be employed. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like, and combinations of two or more thereof.

In one embodiment, the catalyst can be an organotin catalyst such as stannous octoate, dibutyltin dilaurate, dibutyltin diacetate, stannous oleate, or combinations of two or more thereof. In another embodiment, the catalyst can be an organoamine catalyst, for example, tertiary amine such as trimethylamine, triethylamine, triethylenediamine, bis(2,2-dimethylamino)ethyl ether, N-ethylmorpholine, diethylenetriamine, 1,8-diazabicyclo[5.4.0]undec-7-ene, or combinations of two or more thereof. In still another embodiment, the catalyst can include mixtures of tertiary amine and glycol, such as Niax® catalyst C-183 (Momentive Performance Materials Inc.), stannous octoate, such as Niax® stannous octoate catalysts (Momentive Performance Materials Inc.), or combinations of two or more thereof.

According to one embodiment of the present invention, the catalyst is an amine catalyst for the production of high resilience flexible slabstock and molded foams. These amine catalysts can be bis(N,N-dimethylaminoethyl)ether or 1,4-diazabicyclo[2.2.2]octane.

The surfactant (d) may be as selected as desired for a particular purpose or intended application. The amount of surfactant may be in the range of about 0.01 to about 4% weight, preferably in the range of about 0 to about 3% weight, more preferably in the range of about 0 to about 2% weight. For example, the amount of surfactant in % weight may be 0.01, 1, 1.5, 2, 2.5, 3, 3.5, 4, or any 0.01 increment therebetween. Any suitable surfactant that is used in polyurethane foam production may be used, such as, for example, but not limited to, TEGOSTAB® BF-2370, BF-2470 from Evonik; and/or NIAX™ L-895, NIAX™ L-894 NIAX™ L-820; NIAX™ L-580, NIAX™ L-620 from Momentive Performance Materials Inc., but the surfactant is not limited to these examples. Particularly suitable surfactants are silicone surfactants such as those sold under the tradename NIAX from Momentive Performance Materials Inc. Furthermore, the surfactant may comprise one or more components from the above list and their like.

In another embodiment amine catalysts can include mixtures of tertiary amine and glycol, such as Niax® catalyst B-18, stannous octoate, such as Niax® stannous octoate catalyst and combinations thereof, all available from Momentive Performance Materials.

The polyurethane foam-forming composition can include other components (f), such as a blowing agent. The blowing agent can be one blowing agent of the physical and/or chemical type. Typical physical blowing agents include, but are not limited to methylene chloride, acetone, water or $CO_2$, which are used to provide expansion in the foaming process. A typical chemical blowing agent is water, which reacts with isocyanates in the foam, forming reaction mixture to produce carbon dioxide gas. These blowing agents possess varying levels of solubility or compatibility with the other components used in the formation of polyurethane foams. Developing and maintaining a good emulsification when using components with poor compatibility is critical to processing and achieving acceptable polyurethane foam quality.

In one embodiment, the composition comprises water in an amount of from about 0.5 to about 5 parts by weight (pbw), from about 1 to about 4 pbw, from about 1.5 to about 3.5 pbw, or from about 2 to about 3 pbw.

Other components (g), such as additives, can be added to polyurethane foam to impart specific properties to polyurethane foam. Examples of other suitable additives include, but not limited to, fire retardant, stabilizer, coloring agent, filler, anti-bacterial agent, extender oil, anti-static agent, solvent and combinations thereof.

Methods for producing polyurethane foam from the polyurethane foam-forming composition of the present invention are not particularly limited. Various methods commonly used in the art may be employed. For example, various methods described in "Polyurethane Resin Handbook," by Keiji Iwata, Nikkan Kogyo Shinbun, Ltd., 1987 may be used. For example, the composition of the present invention can be prepared by combining the polyols, catalyst, surfactants, blowing agent, polyether functional siloxane, and additional compounds including optional ingredients into a premix. The following procedure was used in the lab for preparing the polyether foam: polyols, amine catalysts, water and silicones were mixed for 60 seconds. Stannous Octoate was added and mixing continued for 10 seconds. After that TDI was added and the mixing continued for 5 seconds. Once the mixing process was finished, the liquid foam was poured into a 20×20×20 cm paper box. The foam rise profile was recorded, and the foams were cured in a forced air oven for 15 minutes then cooled for 24 hours.

EXAMPLES

Polyurethane foams were prepared according the formulas as indicated in the following tables. The examples in accordance with aspects of the present technology use the following additives:

Silicone A (present invention): $MD_{1.5}D''_{1.5}M$, with polyether substituent, 750 MW hydroxy terminated polyether containing 75% EO (main structural features).

Silicone B (present invention): $MD_{11}D''_4M$, with polyether substituent, 550 MW hydroxy terminated polyether containing 100% EO (main structural features).

Silicone C (present invention): $MD_{43}D''_7M$, with polyether substituent, 750 MW hydroxy terminated polyether containing 75% EO (main structural features).

Silicone D (present invention): $MD_{26}D''_2M$, with two polyether substituents, 4000 MW hydroxy terminated polyether containing 40% EO, and 1500 MW hydroxy terminated polyether containing 40% EO (main structural features).

Silicone E (present invention): $MD_{65}D''_8M$, with polyether substituent, 750 MW hydroxy terminated polyether containing 75% EO (main structural features).

Silicone F (present invention): $MD_{65}D''_8M$, with polyether substituent, 1500 MW hydroxy terminated polyether containing 75% EO (main structural features).

M, D, and D" are as described above in the specification. EO is ethylene oxide.

Rising time is when foam rises to the highest point of foaming procedure.

Height is the maximum high value during foaming rising procedure, recorded by a sonar system.

Settling is the percentage of the height loss at 5 minutes during the foaming procedure to compare with the highest value.

Density refers to foam core density.

Foam Hardness and Comfort Factor are measured according to I503386/1. Foam Hardness indicates compression stress at 40% compression. Comfort Factor is the ratio between the compression stress at 65% compression and the compress stress at 25% compression.

Tensile Strength and Elongation are measured according to ASTM D 3574 Test E.

Compression set is measured according to ASTM D 3574 Test D. The foam samples are compressed at 75% as original thickness, and keep in 70° C. oven for 22 hours.

Foam Openness is classified by Airflow value, which is measured according to ASTM D 3574 Test G. When Airflow is higher than 30 Liter/minute, Foam Openness indicates as "open"; when Airflow is between 10 and 30 Liter/minute, Foam Openness indicates as "half open"; when Airflow is below than 10 Liter/minute, Foam Openness is "close".

Examples 1-6

Examples 1-6 and Comparative Example CE-1 were prepared as indicated in Table

TABLE 1

| Formulation ingredients | EXAMPLE | | | | | | |
|---|---|---|---|---|---|---|---|
| | CE-1 pbw | Ex 1 pbw | Ex 2 pbw | Ex 3 pbw | Ex 4 pbw | Ex 5 pbw | Ex 6 pbw |
| Voranol ® CP3322 | 100 | 100 | 100 | 100 | 100 | 100 | 100 |
| Water | 4 | 4 | 4 | 4 | 4 | 4 | 4 |
| Niax ™ Catalyst B-18 | 0.15 | 0.15 | 0.15 | 0.15 | 0.15 | 0.15 | 0.15 |
| Niax ™ Silicone L-895 | 1 | 1 | 1 | 1 | 1 | 1 | 1 |
| Silicone A | | 1 | | | | | |
| Silicone B | | | 1 | | | | |
| Silicone C | | | | 1 | | | |
| Silicone D | | | | | 1 | | |
| Silicone E | | | | | | 1 | |
| Silicone F | | | | | | | 1 |
| Niax ™ Stannous Octoate | 0.18 | 0.18 | 0.18 | 0.18 | 0.18 | 0.18 | 0.18 |
| Lupranate ® T-80 | 49.8 | 49.8 | 49.8 | 49.8 | 49.8 | 49.8 | 49.8 |
| Index Isocyanate | 108 | 108 | 108 | 108 | 108 | 108 | 108 |
| Rise time (s) | 133 | 132 | 128 | 133 | 133 | 124 | 125 |
| Height (mm) | 220 | 218 | 220 | 219 | 223 | 220 | 224 |
| Settling (%) | 0.7 | 1.0 | 0.9 | 0.7 | 0.6 | 0.5 | 0.7 |
| Density (kg/m³) | 26.1 | 25.8 | 26.1 | 25.9 | 25.5 | 26.7 | 25.9 |
| Foam Hardness CFD 40% (kPa) | 3.2 | 3.4 | 3.6 | 3.7 | 3.6 | 4.2 | 3.9 |
| Comfort Factor | 2.4 | 2.4 | 2.5 | 2.5 | 2.5 | 2.5 | 2.5 |
| Tensile strength (kPa) | 86.6 | 86.7 | 78.4 | 79.4 | 84.4 | 78.1 | 89.2 |
| Elongation (%) | 105 | 120 | 109 | 106 | 115 | 91 | 111 |
| Compression set 75% 70° C., 22 h (%) | 4 | 4 | 4 | 4 | 4 | 4 | 4 |
| Foam Openness | Open | Open | Open | Open | Open | Open | Open |
| Cell structure | fine | fine | fine | fine | fine | fine | fine |

Example CE-1 is the reference foam with the foam formulation using 4 parts by weight water and not including any of the present silicone additives. The density of CE-1 was 26.1 kg/m³. The foam hardness was 3.2 kPa. Examples 1-6 are for foam formulations using the addition of one of Silicone A, Silicone B, Silicone C, Silicone D, Silicone E, or Silicone F in accordance with embodiments of the invention. The addition of Silicones A-F at 1 part by weight (pbw) in the polyurethane foam formulations shown in Table 1 surprisingly showed an increase of foam hardness.

Examples 7-9

Foams were prepared from the foam compositions as indicated in Table 2. The foams employed 3 parts by weight of water.

TABLE 2

| Formulation ingredients | EXAMPLE | | | |
|---|---|---|---|---|
| | CE-2 pbw | Ex 7 gbw | Ex 8 pbw | Ex 9 pbw |
| Voranol ® CP3322 | 100 | 100 | 100 | 100 |
| Water | 3 | 3 | 3 | 3 |
| Niax ™ Catalyst B-18 | 0.15 | 0.15 | 0.15 | 0.15 |
| Niax ™ Silicone L- 895 | 1 | 1 | 1 | 1 |
| Silicone C | | 0.5 | 1 | 2 |
| Niax ™ Stannous Octoate | 0.18 | 0.18 | 0.18 | 0.18 |
| Luprante ® T-80 | 39.4 | 39.4 | 39.4 | 39.4 |
| Index Isocyanate | 108 | 108 | 108 | 108 |
| Rise time (s) | 145 | 144 | 146 | 147 |
| Height (mm) | 214 | 215 | 217 | 216 |
| Settling (%) | 1.1 | 0.9 | 0.9 | 0.9 |
| Density (kg/m³) | 32.2 | 32.5 | 32.4 | 32.8 |
| Foam Hardness CFD 40% (kPa) | 3.3 | 3.6 | 3.7 | 3.8 |
| Comfort Factor | 2.4 | 2.4 | 2.5 | 2.5 |
| Tensile strength (kPa) | 92.7 | 86.0 | 95.1 | 87.3 |
| Elongation (%) | 140 | 128 | 126 | 128 |

TABLE 2-continued

| Formulation ingredients | EXAMPLE | | | |
|---|---|---|---|---|
| | CE-2 pbw | Ex 7 gbw | Ex 8 pbw | Ex 9 pbw |
| Compression set 75% 70° C., 22 h (%) | 3 | 3 | 3 | 3 |
| Foam Openness | Open | Open | Open | Open |
| Cell structure | fine | fine | fine | fine |

Example CE-2 is the reference foam with the formulation using 3 parts by weight water. The density of CE-2 was 32.2 kg/m³. The foam hardness was 3.3 kPa. Examples 7-9 are foam formulations that include the addition of Silicone C at 0.5 pbw, 1 pbw, and 2 pbw, respectively. As can be seen from Table 2, the addition of Silicone C in the polyurethane foam formulation provided foams with increased foam Hardness compared to the formulation that did not include the present silicone additives.

Examples 10-12

Foams were prepared from the foam compositions as indicated in Table 3. The foams employed 2 parts by weight of water.

TABLE 3

| | EXAMPLE | | | |
|---|---|---|---|---|
| Formulation ingredients | CE-3 pbw | Ex 10 pbw | Ex 11 pbw | Ex 12 pbw |
| Voranol ® CP3322 | 100 | 100 | 100 | 100 |
| Water | 2 | 2 | 2 | 2 |
| Niax ™ Catalyst B-18 | 0.15 | 0.15 | 0.15 | 0.15 |
| Niax ™ Silicone L- 895 | 1 | 1 | 1 | 1 |
| Silicone B | | 1 | | |
| Silicone C | | | 1 | |
| Silicone F | | | | 1 |
| Niax ™ Stannous Octoate | 0.24 | 0.24 | 0.24 | 0.24 |
| Desmodur ® T 65 N | 28.9 | 28.9 | 28.9 | 28.9 |
| Index isocyanate | 108 | 108 | 108 | 108 |
| Rise time (s) | 183 | 179 | 181 | 176 |
| Height (mm) | 197 | 198 | 196 | 196 |
| Settling (%) | 1.3 | 1.4 | 1.4 | 1.6 |
| Density (kg/m³) | 46.2 | 46.8 | 46.4 | 47.1 |
| Foam Hardness CFD 40% (kPa) | 4.3 | 4.7 | 4.5 | 5.1 |
| Comfort Factor | 2.6 | 2.6 | 2.6 | 2.6 |
| Tensile strength (kPa) | 89.9 | 82.2 | 76.1 | 75.1 |
| Elongation (%) | 140 | 127 | 92 | 108 |
| Compression set 75% 70° C., 22 h (%) | 2 | 2 | 2 | 2 |
| Foam Openness | Open | Open | Open | Open |
| Cell structure | fine | fine | fine | Fine |

Example CE-3 is the reference foam with the formulation using 2 parts by weight water. The density of CE-3 was 46.2 kg/m³. The foam hardness was 4.3 kPa. Examples 10-12 are foam formulations that include the addition of Silicone B, Silicone C, and Silicone F (present invention). The addition of Silicone B, C, or F at 1 part by weight (pbw) in the polyurethane foam formulation presented in table 3 surprisingly showed increase of foam Hardness.

The foregoing description identifies various, non-limiting embodiments of polyurethane foam-forming compositions comprising polyether functional siloxanes, and foams made therefrom in accordance with aspects of the present invention. Modifications may occur to those skilled in the art and to those who may make and use the invention. The disclosed embodiments are merely for illustrative purposes and not intended to limit the scope of the invention or the subject matter set forth in the following claims.

What is claimed is:

1. A flexible polyurethane foam-forming composition comprising:

(a) a polyol;

(b) a polyisocyanate comprising toluene diisocyanate, the polyisocyanate having an isocyanate index of from about 70 to about 120;

(c) a catalyst selected from an organotin catalyst;

(d) a surfactant other than a polyether functional silicone (e); and (e) a polyether functional silicone of the formula:

$$M^*D_xD''_yM^*$$

where:

$M^*$ is $R_a(CH_3)_{3-a}SiO_{1/2}$

D is $(CH_3)_2SiO_{2/2}$

D" is $(CH_3)(R)SiO_{2/2}$ x is 1-100;

y is 1-20 a is 0 or 1;

R is polyether substituent $C_nH_{2n}O(C_2H_4O)_b(C_3H_6O)_cR^1$ derived from a single type of polyether substituent, where $R^1$ is —H, —$R^3N(H)R^2$, or —$R^3SH$, $R^2$ is H or a C1-C10 alkyl, $R^3$ is C1-C10 alkylene; n is 3 to 4; b is a number such that the ethylene oxide residues constitute from about 30% to about 100% by weight of the alkylene oxide residues of the polyether substituent R; c is a number such that the propylene oxide residues constitute from about 0% to about 70% by weight of the alkylene oxide residues of the polyether substituent R; and the substituent R has a number average molecular weight of from about 200 Dalton to about 5000 Dalton, with the proviso that the flexible polyurethane foam-forming composition is free of a physical blowing agent except that the composition may optionally comprise carbon dioxide or methylene chloride, and wherein a foam produced from the composition is a flexible polyurethane foam.

2. The flexible polyurethane foam-forming composition of claim 1, wherein b in polyether functional silicone (e) is such that the ethylene oxide residues constitute from about 35% to about 100% by weight of the alkylene oxide residues of the polyether substituent R.

3. The flexible polyurethane foam-forming composition of claim 1, wherein b in polyether functional silicone (e) is such that the ethylene oxide residues constitute from about 40% to about 100% by weight of the alkylene oxide residues of the polyether substituent R.

4. The flexible polyurethane foam-forming composition of claim 1, wherein the polyether substituent R of the polyether functional silicone (e) has an ethylene oxide residue content of from about 70% to about 100% by weight.

5. The flexible polyurethane foam-forming composition of claim 1, wherein b of the polyether functional silicone (e) is such that the ethylene oxide residues constitute from about 75% to about 95% by weight of the alkylene oxide residues of the polyether substituent R.

6. The flexible polyurethane foam-forming composition of claim 1, wherein $R^1$ in the polyether functional silicone (e) is —H.

7. The flexible polyurethane foam-forming composition of claim 1, wherein the polyether substituent R of the polyether functional silicone (e) is a polyether substituent having a number average molecular weight of from about 400 Dalton to about 4000 Dalton.

8. The flexible polyurethane foam-forming composition of claim 1, wherein R in the polyether functional silicone (e) has a number average molecular weight of from about 500 Dalton to about 1500 Dalton.

9. The flexible polyurethane foam-forming composition of claim 1, wherein y in the polyether functional silicone (e) is 2-20.

10. The flexible polyurethane foam-forming composition of claim 1, wherein y in polyether functional silicone (e) is 1-10.

11. The flexible polyurethane foam-forming composition of claim 1, wherein the polyether functional silicone (e) is present in an amount of from about 0.1 to about 10 parts by weight based on the total weight of the flexible polyurethane foam-forming composition.

12. A flexible polyurethane foam formed from the flexible polyurethane foam-forming composition of claim 1.

13. The flexible polyurethane foam of claim 12, wherein the flexible polyurethane foam has a hardness that is greater than the hardness of a foam formed in the absence of the polyether functional silicone (e).

14. The flexible polyurethane foam-forming composition of claim 1 comprising water in an amount of about 0.5 parts by weight to about 5 parts by weight based on the weight of the polyurethane foam-forming composition.

15. The flexible polyurethane foam-forming composition of claim 1 comprising a blowing agent selected from methylene chloride or carbon dioxide.

* * * * *